(12) United States Patent
Ahmet (10) Patent No.: US 12,081,984 B2
(45) Date of Patent: Sep. 3, 2024

(54) INCREASING EFFICIENCY OF COMMUNICATION BETWEEN A MOBILE DEVICE AND A SATELLITE ASSOCIATED WITH A WIRELESS TELECOMMUNICATION NETWORK

(71) Applicant: T-Mobile USA, Inc., Bellevue, WA (US)

(72) Inventor: Jeff Ahmet, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 307 days.

(21) Appl. No.: 17/731,245

(22) Filed: Apr. 27, 2022

(65) Prior Publication Data

US 2023/0354029 A1    Nov. 2, 2023

(51) Int. Cl.
| | |
|---|---|
| *H04W 12/08* | (2021.01) |
| *H04W 12/06* | (2021.01) |
| *H04W 76/10* | (2018.01) |
| H04W 84/04 | (2009.01) |
| H04W 84/06 | (2009.01) |

(52) U.S. Cl.
CPC ........... *H04W 12/08* (2013.01); *H04W 12/06* (2013.01); *H04W 76/10* (2018.02); *H04W 84/042* (2013.01); *H04W 84/06* (2013.01)

(58) Field of Classification Search
CPC ..... H04W 12/08; H04W 12/06; H04W 76/10; H04W 84/042; H04W 84/06
See application file for complete search history.

(56) References Cited

U.S. PATENT DOCUMENTS

| | | | |
|---|---|---|---|
| 5,646,630 | A | 7/1997 | Sheynblat et al. |
| 5,655,005 | A | 8/1997 | Wiedeman et al. |
| 5,978,649 | A | 11/1999 | Kahn |
| 6,151,497 | A | 11/2000 | Yee et al. |

(Continued)

FOREIGN PATENT DOCUMENTS

| | | |
|---|---|---|
| CN | 1194512 A | 9/1998 |
| CN | 107113709 A | 8/2017 |

(Continued)

OTHER PUBLICATIONS

International Searching Authority, International Search Report and Written Opinion, PCT Patent Application PCT/US2023/017117, mailed Jul. 20, 2023, 10 pages.

*Primary Examiner* — Izunna Okeke
(74) *Attorney, Agent, or Firm* — Perkins Coie LLP (57) ABSTRACT

The system obtains an access class associated with a UE, where the access class indicates whether the UE is authorized to communicate with a satellite, and stores the access class at the UE. The system obtains broadcast information from the satellite, where the broadcast information indicates one or more access classes authorized to communicate with the satellite. The system determines whether the access class stored at the UE is included in the one or more access classes authorized to communicate with the satellite. Upon determining that the access class is not included in the one or more access classes, the system reduces communication with the satellite by refraining from sending a request to connect to the satellite. Upon determining that the access class is included in the one or more access classes, the system sends the request to connect to the satellite.

19 Claims, 6 Drawing Sheets

(56) References Cited

U.S. PATENT DOCUMENTS

| | | |
|---|---|---|
| 6,370,126 B1 | 4/2002 | De et al. |
| 6,567,668 B1 | 5/2003 | Valentine et al. |
| 6,904,265 B1 | 6/2005 | Valdivia et al. |
| 6,973,333 B1 | 12/2005 | Oneil |
| 7,177,651 B1 | 2/2007 | Almassy |
| 8,060,108 B1 | 11/2011 | Rayburn et al. |
| 8,099,106 B2 | 1/2012 | Soliman et al. |
| 8,160,623 B1 | 4/2012 | Talley et al. |
| 8,243,923 B2 | 8/2012 | Norin et al. |
| 8,254,885 B1 | 8/2012 | Xue et al. |
| 8,326,282 B2 | 12/2012 | Margis |
| 8,660,521 B1 | 2/2014 | Daniel et al. |
| 8,675,486 B2 | 3/2014 | Friedman et al. |
| 8,738,075 B2 | 5/2014 | Zhang et al. |
| 8,868,028 B1 | 10/2014 | Kaltsukis |
| 9,338,518 B2 | 5/2016 | Chang et al. |
| 9,609,500 B2 | 3/2017 | Noonan et al. |
| 9,762,310 B2 | 9/2017 | Ling |
| 9,787,392 B2 | 10/2017 | Baudoin et al. |
| 9,819,410 B1 | 11/2017 | Azevedo et al. |
| 10,506,437 B2 | 12/2019 | Corson |
| 10,690,778 B2 | 6/2020 | Chandrasekar et al. |
| 10,841,000 B2 | 11/2020 | Bode |
| 2005/0013262 A1 | 1/2005 | Zein et al. |
| 2005/0163048 A1 | 7/2005 | Arora et al. |
| 2005/0215194 A1 | 9/2005 | Boling et al. |
| 2007/0178833 A1 | 8/2007 | Wahlberg et al. |
| 2008/0167031 A1 | 7/2008 | Sorber et al. |
| 2010/0037308 A1 | 2/2010 | Lin et al. |
| 2015/0035701 A1 | 2/2015 | Zhang et al. |
| 2017/0280326 A1 | 9/2017 | Corson |
| 2018/0006710 A1 | 1/2018 | Buer et al. |
| 2019/0158988 A1 | 5/2019 | Lee et al. |
| 2020/0280366 A1* | 9/2020 | Bode ............... H04L 67/10 |
| 2020/0359059 A1 | 11/2020 | Zhang et al. |
| 2021/0018630 A1 | 1/2021 | Mueller et al. |
| 2021/0080591 A1 | 3/2021 | Gunnarsson et al. |
| 2021/0312448 A1 | 10/2021 | Kinagi |
| 2022/0086713 A1 | 3/2022 | Määttänen et al. |
| 2022/0094430 A1 | 3/2022 | Edge |
| 2022/0104084 A1 | 3/2022 | Liberg et al. |

FOREIGN PATENT DOCUMENTS

| | | |
|---|---|---|
| CN | 108432172 A | 8/2018 |
| CN | 105515640 B | 11/2018 |
| CN | 107079362 B | 11/2018 |
| CN | 108781471 A | 11/2018 |
| CN | 108429578 B | 8/2019 |
| CN | 106792755 B | 10/2019 |
| CN | 109788548 B | 6/2020 |
| CN | 108076526 B | 10/2020 |
| CN | 112584441 A | 3/2021 |
| CN | 112087750 B | 12/2021 |
| DE | 102018000323 A1 | 7/2019 |
| DE | 102020110447 A1 | 1/2021 |
| EP | 0866569 A2 | 9/1998 |
| EP | 1021769 A1 | 7/2000 |
| EP | 1146739 A2 | 10/2001 |
| EP | 1171840 A2 | 1/2002 |
| EP | 1977536 A2 | 10/2008 |
| EP | 1604541 B1 | 5/2010 |
| EP | 2400810 B1 | 1/2013 |
| EP | 1639854 B1 | 9/2016 |
| EP | 2484088 B1 | 2/2018 |
| JP | 3266322 B2 | 3/2002 |
| JP | 2005160046 A | 6/2005 |
| JP | 3880080 B2 | 11/2006 |
| JP | 3931261 B2 | 3/2007 |
| JP | 4965149 B2 | 4/2012 |
| JP | 5421883 B2 | 11/2013 |
| JP | 6554241 B1 | 7/2019 |
| KR | 20020021426 A | 3/2002 |
| KR | 100407659 B1 | 12/2003 |
| KR | 20040076739 A | 9/2004 |
| KR | 20050098982 A | 10/2005 |
| KR | 20070075529 A | 7/2007 |
| KR | 100777821 B1 | 11/2007 |
| KR | 20080011533 A | 2/2008 |
| KR | 20080022868 A | 3/2008 |
| KR | 100942299 B1 | 2/2010 |
| KR | 101322561 B1 | 10/2013 |
| KR | 101545108 B1 | 8/2015 |
| KR | 101920131 B1 | 11/2018 |
| KR | 20210121051 A | 10/2021 |
| KR | 20210127125 A | 10/2021 |
| WO | 9927716 A1 | 6/1999 |
| WO | 2011063655 A1 | 6/2011 |
| WO | 2020089471 A1 | 5/2020 |
| WO | 2020164366 A1 | 8/2020 |
| WO | 2020165244 A1 | 8/2020 |
| WO | 2020202121 A1 | 10/2020 |
| WO | 2020222203 A1 | 11/2020 |
| WO | 2021058576 A1 | 4/2021 |
| WO | 2021221736 A2 | 11/2021 |
| WO | 2021248500 A1 | 12/2021 |
| WO | 2021251888 A1 | 12/2021 |

* cited by examiner

INCREASING EFFICIENCY OF COMMUNICATION BETWEEN A MOBILE DEVICE AND A SATELLITE ASSOCIATED WITH A WIRELESS TELECOMMUNICATION NETWORK

BACKGROUND

A communications satellite is an artificial satellite that relays and amplifies radio telecommunication signals via a transponder, thus creating a communication channel between a source transmitter and a receiver at different locations on Earth. Communications satellites are used for television, telephone, radio, internet, and military applications. As of Jan. 1, 2021, there were 2,224 communications satellites in Earth orbit. Most communications satellites are in geostationary orbit 22,300 miles (35,900 km) above the equator, so that each such satellite appears stationary at the same point in the sky. Consequently, the satellite dish antennas of ground stations can be aimed permanently at that spot and do not have to move to track the satellite.

The process of satellite communication begins at an Earth station designed to transmit and receive signals from a satellite in an orbit around the Earth. Earth stations send the information to satellites in the form of high-powered, high-frequency (GHz range) signals. Satellite communication is resource-intensive in terms of the power required to communicate with the satellite, bandwidth use, and satellite resources. Sometimes a terrestrial device can request communication with the satellite, using communication and satellite resources, even though the satellite may not be configured to communicate with the terrestrial device.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to increase efficiency of communication between a mobile device and a satellite associated with a wireless telecommunication link or network. The system obtains an indication of an access class associated with the mobile device, where the indication of the access class indicates whether the mobile device is authorized to communicate with the satellite. The access classes are defined in 3GPP TS 22.01 and include access classes from 0 through 15. Access classes 0 through 9 are randomly assigned to mobile devices on the wireless telecommunication network, access class 10 is for emergency calls, and access classes 11-15 are assigned to operators such as public utilities, network operators, security services, emergency services, etc. Access classes 16-21 can be dedicated to satellite communication. For example, access class 16 can be dedicated to satellite communication for the general public, while access classes 17-21 can be dedicated to enabling satellite communication for the operators described above. The system can store the indication of the access class at the mobile device.

The system obtains broadcast information associated with the satellite, where the broadcast information indicates one or more access classes authorized to communicate with the satellite. The system can determine whether the access class stored at the mobile device is included in the one or more access classes authorized to communicate with the satellite. Upon determining that the access class is not included in the one or more access classes authorized to communicate with the satellite, the system can reduce communication with the satellite by refraining from sending a request to connect to the satellite. Without knowing the access classes that the satellite services, and without knowing the access class of the mobile device, the mobile device would have to send a request to the satellite asking for roaming services. The satellite would have to analyze the request, only to determine that the satellite cannot provide services to the mobile device. The disclosed system avoids the unnecessary communication between the satellite and the mobile device by communicating access classes between the satellite and the mobile device. By avoiding unnecessary communication, the system reduces satellite bandwidth consumption and use of satellite resources in receiving and analyzing the request. Upon determining that the access class is included in the one or more access classes authorized to communicate with the satellite, the system can send the request to connect to the satellite.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
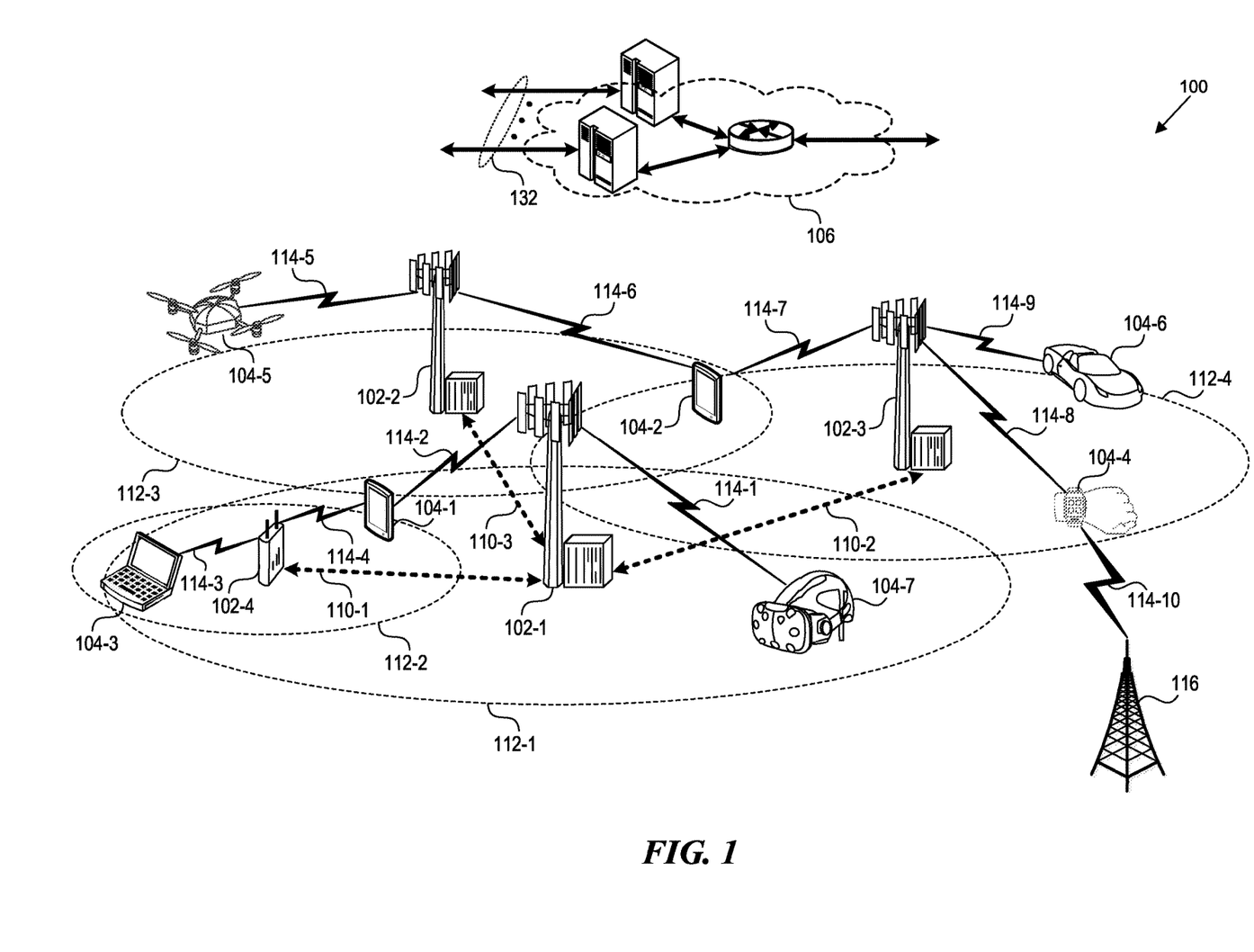
FIG. 1 is a block diagram that illustrates a wireless communications system that can implement aspects of the present technology.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "geographic coverage area 112" or collectively as "geographic coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNBs is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. A small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively small geographic area and can allow unrestricted access by wireless devices that have service subscriptions with the network 100 provider. A femto cell covers a relatively small geographic area (e.g., a home) and can provide restricted access by wireless devices having an association with the femto unit (e.g., wireless devices in a closed subscriber group (CSG) or wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
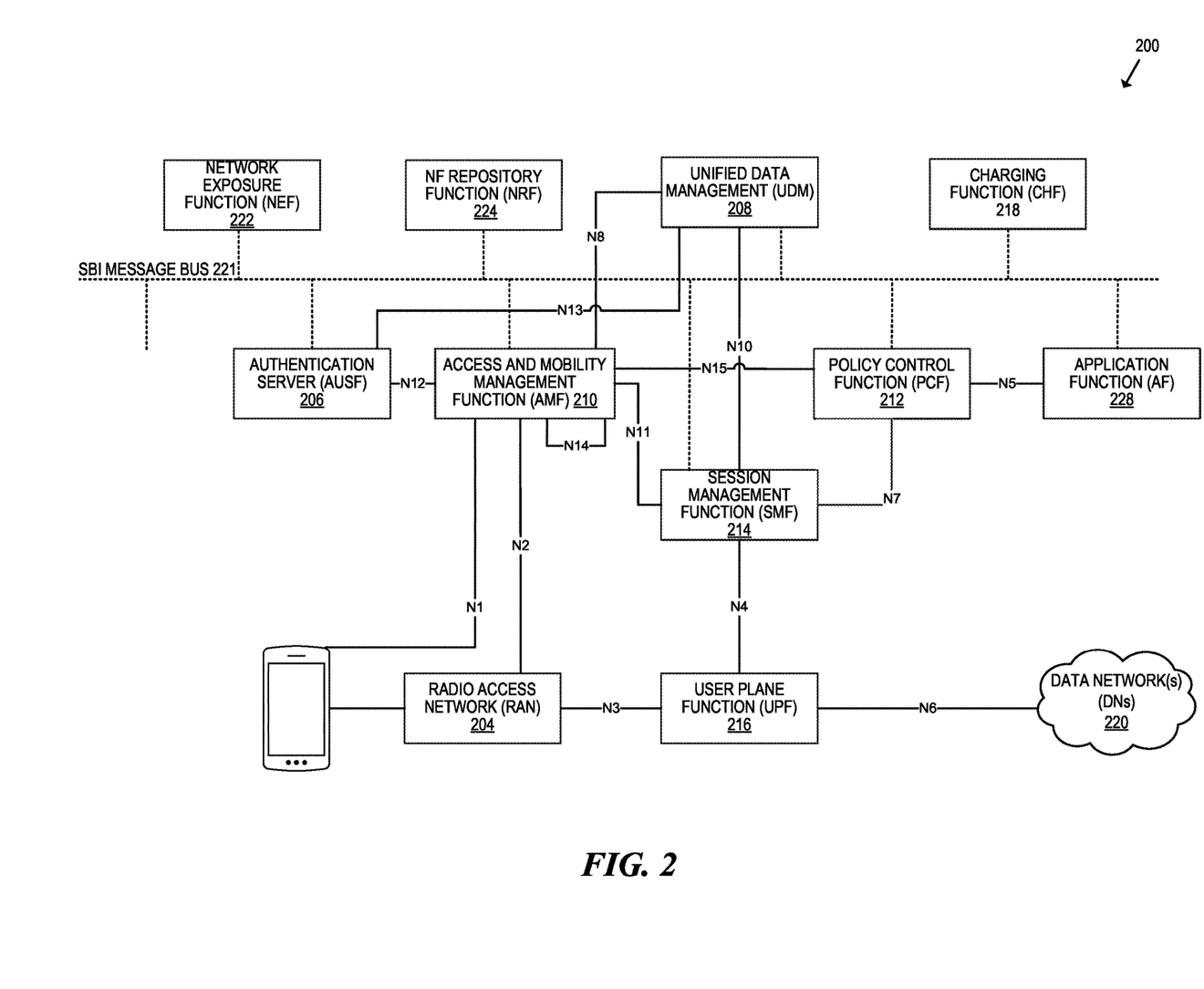
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Radio Access Network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service-Based Architecture (SBA) through a Service-Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and it includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS) in that it provides authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Figure 3:
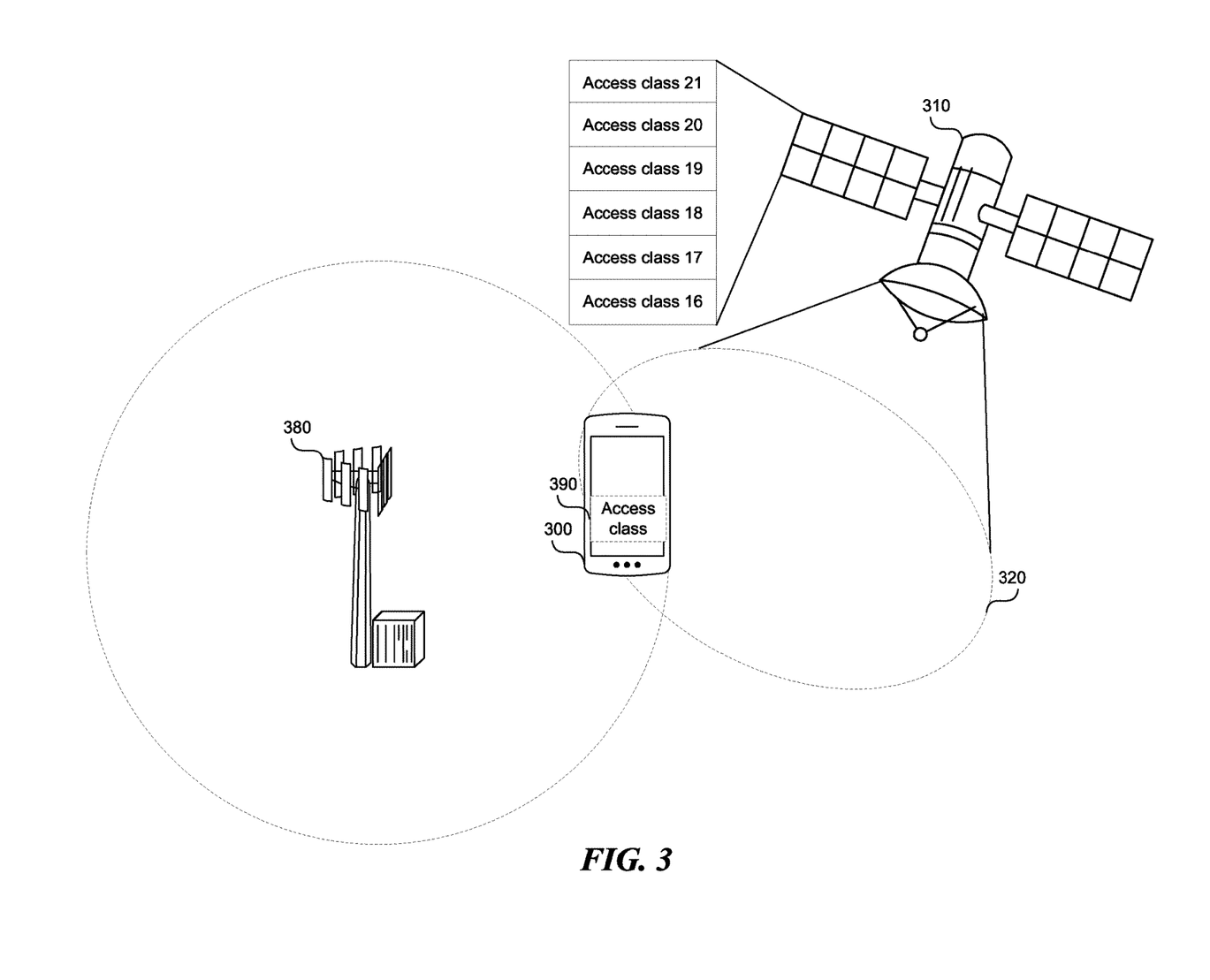
FIG. 3 shows a system to increase efficiency of communication between a UE and a satellite associated with the network.

Increasing Efficiency of Communication Between a Mobile Device and a Satellite Associated with a Wireless Telecommunication Network FIG. 3 shows a system to increase efficiency of communication between a UE and a satellite associated with the network. The network 100 in FIG. 1 can include the satellite 310 and a cell tower 380, both of which can provide wireless telecommunication coverage to a UE 300.

Currently, when the UE 300 wants to attempt to establish roaming communication with the satellite 310, the UE can send a request to the satellite to approve communication from the UE. The satellite 310 may not provide communication services to every class of UE; it may be restricted to a particular set of classes 16, 17, 18, 19, 20, 21. Without the UE being aware of the set of classes that the satellite 310 services, the UE requests to communicate with the satellite unnecessarily consume the bandwidth of the satellite communication and unnecessarily consume the resources of the satellite 310 and the UE 300 itself because the satellite 310 has to analyze the request and the UE 300 needs to generate the request.

The disclosed network 100 reduces the unnecessary communication between the UE 300 and the satellite 310 associated with the network. The satellite 310 can include one or more of the access classes 16, 17, 18, 19, 20, 21 that it can serve. The access classes can be defined in 3GPP TS 22.011. The UE 300, in turn, can store an access class 390 to which the UE belongs. For example, if the access class 390 is in the list of one or more access classes 16, 17, 18, 19, 20, 21, the satellite 310 can engage with the UE 300.

3GPP TS 22.011 defines 16 access classes from 0 to 15 that can be used in terrestrial wireless telecommunication networks. All UEs are members of one out of ten randomly allocated mobile populations, defined as access classes (AC) 0 to 9. The AC can be stored in the Subscriber Identity Module (SIM), the Universal Subscriber Identity Module (USIM), or the embedded-SIM (eSIM) of the UE. The device can download the AC locally to save reading the SIM each time after power on. In addition, UEs may be members of one or more out of five special categories (access classes 11 to 15), also held in the SIM, USIM, and/or eSIM. These are allocated to specific high-priority users, as listed below. The enumeration below is not meant as a priority sequence:

Access class 15—Public Land Mobile Network (PLMN) staff;
Access class 14—Emergency services;
Access class 13—Public utilities (e.g., water/gas suppliers);
Access class 12—Security services; and
Access class 11—For PLMN use.

The network 100 introduces additional access classes for satellite communications, for example:

Access class 21—satellite communication for PLMN staff;
Access class 20—satellite communication for emergency services;
Access class 19—satellite communication for public utilities (e.g., water/gas suppliers);
Access class 18—satellite communication for security services;
Access class 17—satellite communication for PLMN use; and
Access Class 16—satellite communication for the general public.

The satellite 310 can store one or more of the above access classes 16, 17, 18, 19, 20, 21. The stored class indicates which access class of UE 300 the satellite 310 services.

To connect the UE 300 to the satellite 310, the satellite can broadcast the access classes 16, 17, 18, 19, 20, 21 that the satellite can serve. The UE 300 can receive the broadcast and can determine whether the access class 390 stored in the UE belongs to one of the broadcasted classes. If the access class 390 does not belong to one of the broadcasted classes, the UE 300 does not attempt to communicate with the satellite. Consequently, the UE saves bandwidth on the satellite communication channel by not unnecessarily requesting to connect to the satellite, which does not serve the access class 390. In addition, by determining that the satellite 310 does not serve the access class 390, the UE 300 preserves the processing power of the satellite because the satellite does not have to determine whether the request should be granted. Without the access class 390 stored in the UE 300, the roaming UE would send a request to the satellite 310 including the PLMN ID asking the satellite to approve the request. The satellite 310 would have to analyze the request based on the PLMN ID to determine that the request should be denied, thus unnecessarily consuming processing cycles.

To enable the UE 300 to communicate with the satellite, in one embodiment, the user of the UE can opt into satellite communication on a website provided by the network 100. In another embodiment, the network 100 or the UE 300 can determine whether the UE is close to entering the region 320 in which the satellite 310 is providing coverage. The network 100 or the UE 300 can determine whether the UE is configured to engage in satellite communication—for example, whether the UE has a satellite transceiver. The network 100 or the UE 300 can determine whether the UE is already associated with an access class 390 enabling satellite communication. If the UE 300 is close to entering the region 320 or within the region 320, if the UE is capable of satellite communication, and if the UE is not associated with access class 390 enabling satellite communication, the network 100 can send a text message to the UE including a link to a webpage through which the user of the UE can subscribe for satellite communication. The network 100 can store the access class 390 of the UE in the HSS associated with the network.

The technical capabilities of the UE 300 can be determined based on the Type Allocation Code (TAC) of the UE. TAC is the initial 8-digit portion of the 15-digit International Mobile Equipment Identity (IMEI) and 16-digit International Mobile Station Equipment Identity Software Version (IMEISV) codes used to uniquely identify wireless devices. The Type Allocation Code identifies a particular model (and often revision) of wireless telephone, thus indicating whether the particular UE 300 is capable of satellite communication.

In case of an emergency, such as an outage in the terrestrial network, or a disaster scenario, the satellite access classes 16, 17, 18, 19, 20, 21 can be modified to not be accessible to the general public, such as access class 16, and/or to only be accessible to first responders, such as access class 20. In that case, if the satellite 310 is engaged with the UE 300 belonging to an unauthorized access class, such as access class 16, the satellite can seize the communication and can broadcast the modified access classes to the UEs.

Figure 4:
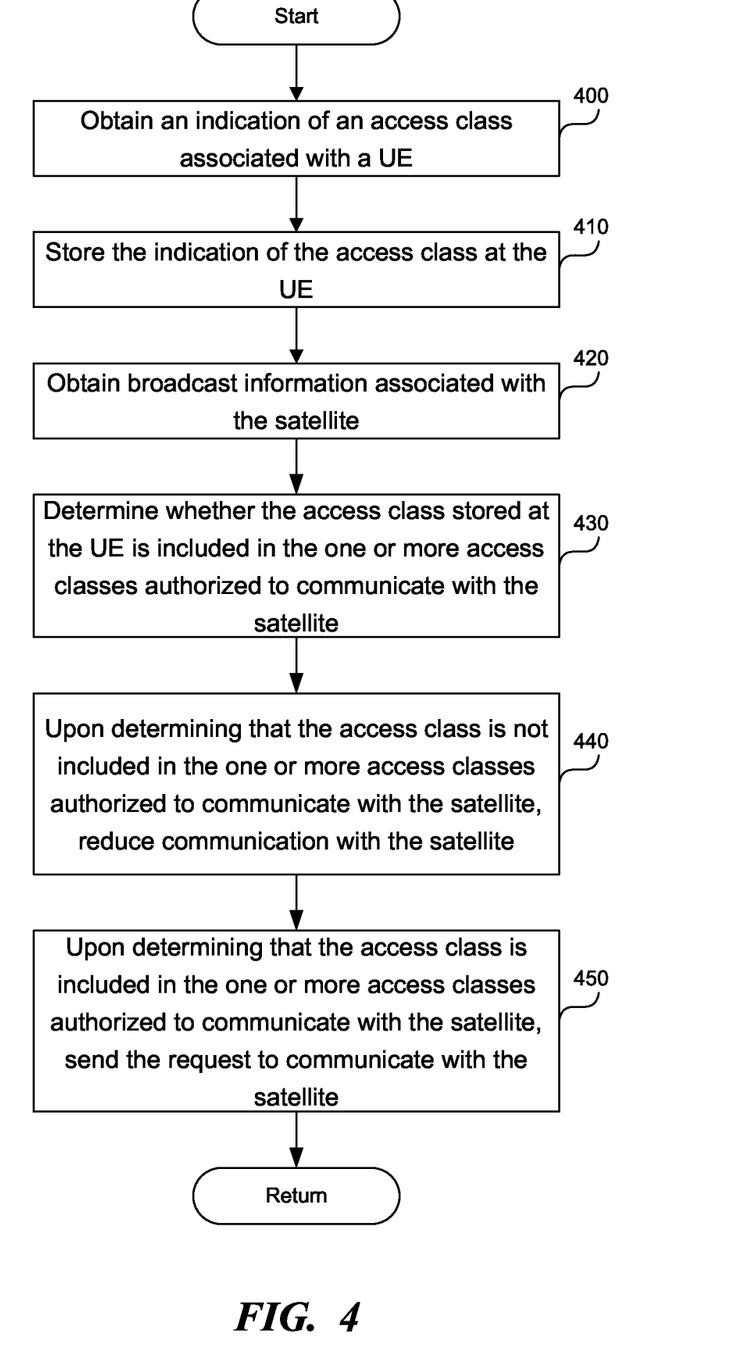
FIG. 4 is a flowchart of a method to increase efficiency of communication between a UE and a satellite associated with a wireless telecommunication network.

FIG. 4 is a flowchart of a method to increase efficiency of communication between a UE and a satellite associated with a wireless telecommunication network. In step 400, a hardware or software processor executing instructions described in this application can obtain an indication of an access class associated with a UE, where the indication of the access class indicates whether the UE is authorized to communicate with the satellite associated with the wireless telecommunication network. To obtain the indication of the access class associated with the UE, the processor can obtain from a HSS the access class associated with the UE.

In step 410, the processor can store the indication of the access class at the UE, in the SIM, USIM, or eSIM card of the UE. In step 420, the processor can obtain broadcast information associated with the satellite, where the broadcast information indicates one or more access classes authorized to communicate with the satellite. The one or more access classes authorized to communicate with the satellite and the access class associated with the UE can include satellite communication for PLMN staff, satellite communication for emergency services, satellite communication for public utilities, satellite communication for security services, satellite communication for PLMN use, or satellite communication for the general public. The one or more access classes authorized to communicate with the satellite and the access class associated with the UE are defined in 3GPP TS 22.01.

In step 430, the processor can determine whether the access class stored at the UE is included in the one or more access classes authorized to communicate with the satellite.

In step 440, upon determining that the access class is not included in the one or more access classes authorized to communicate with the satellite, the processor can reduce communication with the satellite by refraining from sending a request to connect to the satellite. In step 450, upon determining that the access class is included in the one or more access classes authorized to communicate with the satellite, the processor can send the request to connect to the satellite.

The processor can determine whether the UE is configured to communicate with the satellite, such as whether the UE has a satellite transceiver. The processor can determine whether the UE is approaching a region in which the satellite is providing wireless telecommunication coverage. The processor can determine whether the access class stored at the UE authorizes communication with the satellite. Upon determining that the UE is configured to communicate with the satellite, that the UE is approaching the region in which the satellite is providing wireless telecommunication coverage, and that the access class stored at the UE does not authorize communication with the satellite, the processor can send a request to the wireless telecommunication network to authorize the UE to communicate with the satellite. The processor can obtain from the wireless telecommunication network the access class indicating that the UE is authorized to communicate with the satellite. The processor can store the access class on the UE.

In case of emergency, once the processor establishes communication between the UE and the satellite, the processor can receive a modification to the one or more access classes authorized to communicate with the satellite. The modification can remove the access class associated with the UE from the one or more access classes authorized to communicate with the satellite. Upon receiving the modification, the processor can discontinue communication between the UE and the satellite.

The processor can determine whether the UE is configured to communicate with the satellite, such as whether the UE has a satellite transceiver, as well as software to operate the satellite transceiver. Upon determining that the UE is configured to communicate with the satellite, the processor can send a request to the wireless telecommunication network to subscribe the UE to communicate with the satellite.

Figure 5:
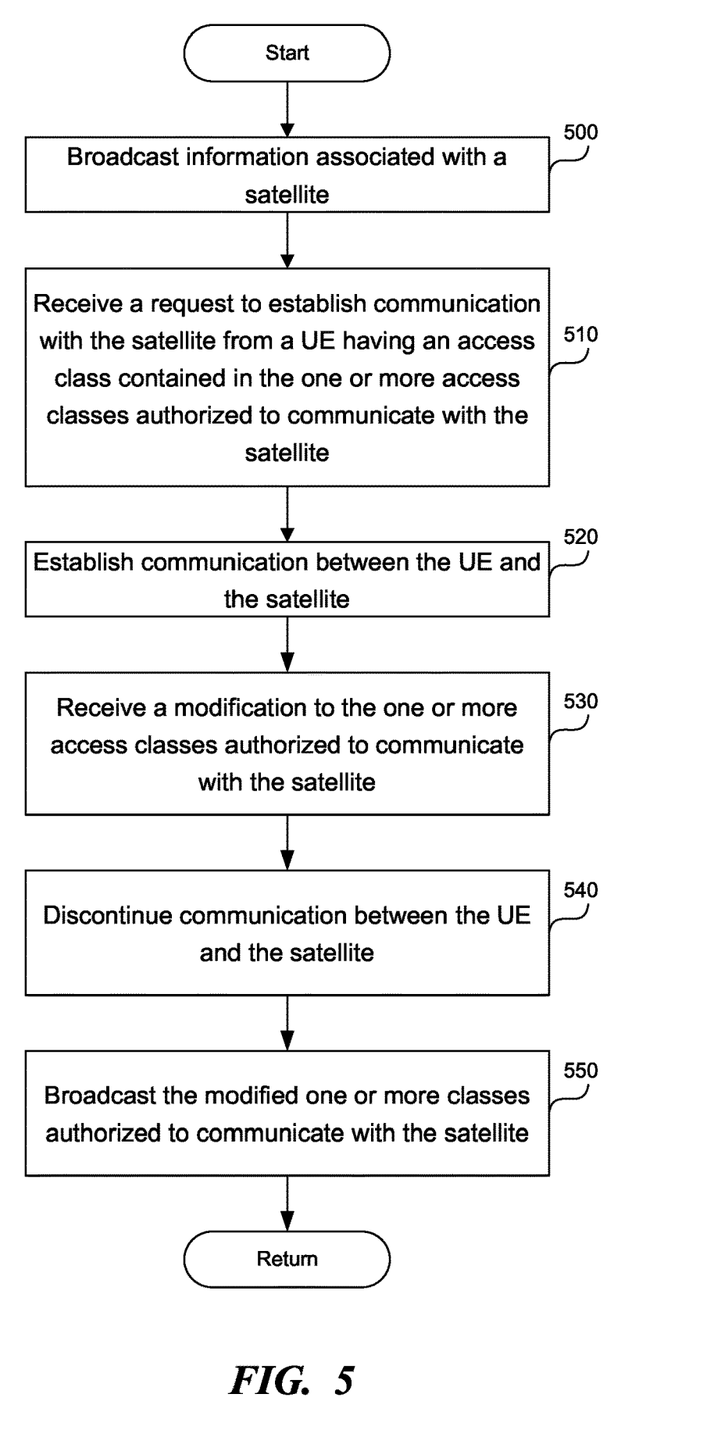
FIG. 5 is a flowchart of a method to change access classes in an emergency.

FIG. 5 is a flowchart of a method to change access classes in an emergency. In step 500, the processor can broadcast information associated with a satellite, where the information indicates one or more access classes authorized to communicate with the satellite. The one or more access classes authorized to communicate with the satellite can be defined in 3GPP TS 22.01.

In step 510, the processor can receive a request to establish communication with the satellite from a UE having an access class contained in the one or more access classes authorized to communicate with the satellite. In step 520, the processor can establish communication between the UE and the satellite.

In step 530, the processor can receive a modification to the one or more access classes authorized to communicate with the satellite. The modification can remove the access class associated with the UE from the one or more access classes authorized to communicate with the satellite.

In step 540, the processor can discontinue communication between the UE and the satellite. In step 550, the processor can broadcast the modified one or more classes authorized to communicate with the satellite.

The processor can determine whether the UE is configured to communicate with the satellite. The processor can determine whether the UE is approaching a region in which the satellite is providing wireless telecommunication coverage. The processor can determine whether the access class stored at the UE authorizes communication with the satellite. Upon determining that the UE is configured to communicate with the satellite, that the UE is approaching the region in which the satellite is providing wireless telecommunication coverage, and that the access class stored at the UE does not authorize communication with the satellite, the processor can send a notification to the UE indicating a process to authorize the UE to communicate with the satellite. The notification can include a text message with a link to opt in. The processor can receive a request from the UE to complete the process to authorize the UE to communicate with the satellite. The processor can store an identifier associated with the UE and an indication that the UE is authorized to communicate with a satellite in an HSS.

Computer System

Figure 6:
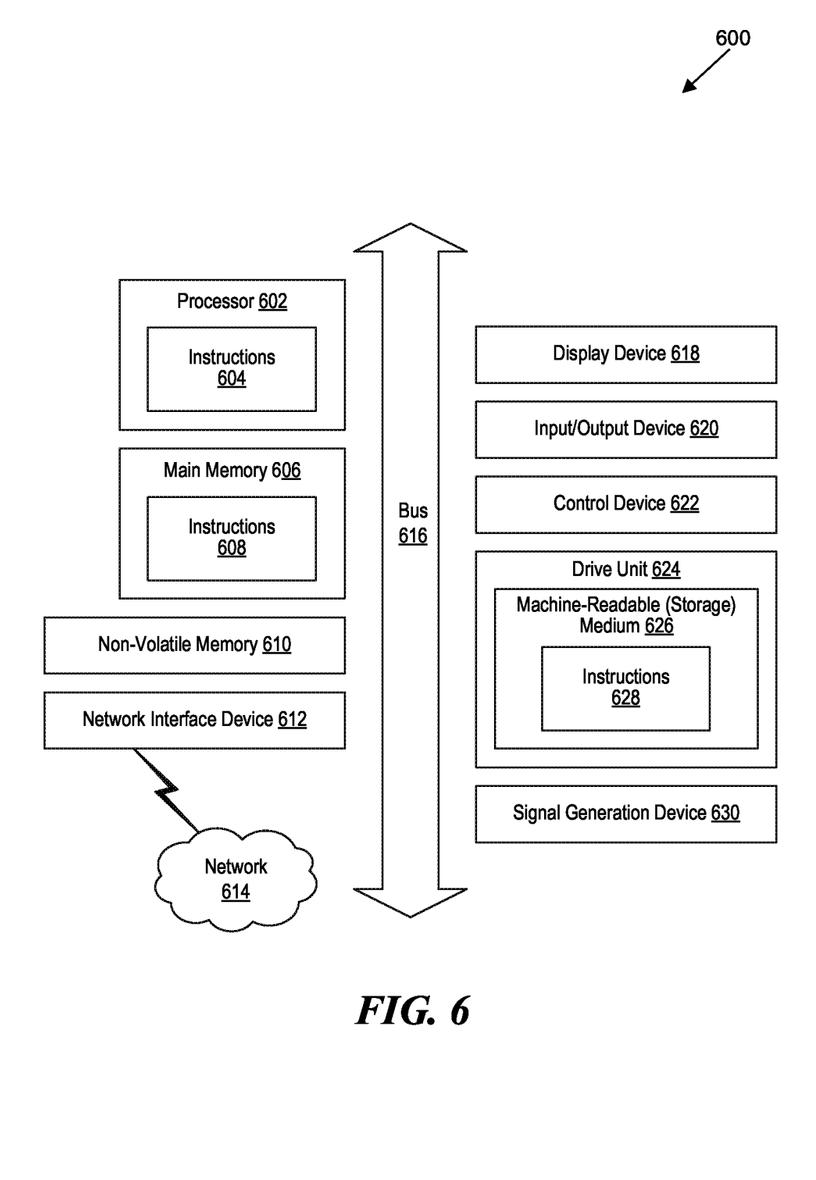
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include one or more processors 602, main memory 606, non-volatile memory 610, a network interface device 612, a video display device 618, an input/output device 620, a control device 622 (e.g., a keyboard and pointing device), a drive unit 624 that includes a machine-readable (storage) medium 626, and a signal generation device 630, all of which are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computer system 600 can share an architecture similar to that of a server computer, personal computer (PC), tablet computer, mobile telephone, game console, music player, wearable electronic device, network-connected ("smart") device (e.g., a television or home assistant device), AR/VR system (e.g., a head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it may include one or more cloud components in one or more networks. Where appropriate, one or more computer systems 600 can perform operations in real time, near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adaptor card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable (storage) medium 626) can be local, remote, or distributed. Although shown as a single medium, the machine-readable (storage) medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable (storage) medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variant thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

I claim:

1. At least one computer-readable storage medium, excluding transitory signals and carrying instructions to increase efficiency of communication between a mobile device and a satellite associated with a wireless telecommunication network, which, when executed by at least one data processor of a system, cause the system to:
   obtain an indication of an access class associated with the mobile device,
      wherein the indication of the access class indicates whether the mobile device is authorized to communicate with the satellite associated with the wireless telecommunication network;
   store the indication of the access class at the mobile device;
   obtain broadcast information associated with the satellite,
      wherein the broadcast information indicates one or more access classes authorized to communicate with the satellite, and
      wherein the one or more access classes authorized to communicate with the satellite and the access class associated with the mobile device are defined in 3GPP TS 22.01;
   determine whether the mobile device is configured to communicate with the satellite;
   determine whether the mobile device is approaching a region in which the satellite is providing wireless telecommunication coverage;
   determine whether the indication of the access class stored at the mobile device is included in the one or more access classes authorized to communicate with the satellite;
   when determining that the mobile device is configured to communicate with the satellite, that the mobile device is approaching the region in which the satellite is providing wireless telecommunication coverage, and that the indication of the access class is not included in the one or more access classes authorized to communicate with the satellite, reduce communication with the satellite by refraining from sending a request to connect to the satellite and send a request to the wireless telecommunication network to authorize the mobile device to communicate with the satellite; and
   when determining that the access class is included in the one or more access classes authorized to communicate with the satellite, send the request to connect to the satellite.

2. The computer-readable medium of claim 1, comprising instructions to:
   establish communication between the mobile device and the satellite;
   receive a modification to the one or more access classes authorized to communicate with the satellite,
      wherein the modification removes the access class associated with the mobile device from the one or more access classes authorized to communicate with the satellite; and
   discontinue communication between the mobile device and the satellite.

3. The computer-readable medium of claim 1, comprising instructions to:
   obtain from the wireless telecommunication network the access class indicating that the mobile device is authorized to communicate with the satellite; and
   store the access class on the mobile device.

4. The computer-readable medium of claim 1, wherein the instructions to obtain the indication of the access class associated with the mobile device comprise instructions to:
   obtain from a Home Subscriber Server the access class associated with the mobile device.

5. The computer-readable medium of claim 1, comprising instructions to:
   determine whether the mobile device is configured to communicate with the satellite;
   upon determining that the mobile device is configured to communicate with the satellite, send a request to the wireless telecommunication network to subscribe the mobile device to communicate with the satellite.

6. The computer-readable medium of claim 1, wherein the one or more access classes authorized to communicate with the satellite and the access class associated with the mobile device include satellite communication for Public Land Mobile Network staff, satellite communication for emergency services, satellite communication for public utilities, satellite communication for security services, satellite communication for Public Land Mobile Network use, or satellite communication for general public.

7. The computer-readable medium of claim 1, wherein the instructions to store the indication of the access class at the mobile device comprise instructions to:
store the indication of the access class in a SIM card or eSIM card associated with the mobile device.

8. A system comprising:
at least one hardware processor; and
at least one non-transitory memory storing instructions, which, when executed by the at least one hardware processor, cause the system to:
obtain an indication of an access class associated with a UE,
wherein the indication of the access class indicates whether the UE is authorized to communicate with a satellite associated with a wireless telecommunication network or wireless communications link;
store the indication of the access class at the UE;
obtain information associated with the satellite,
wherein the information indicates one or more access classes authorized to communicate with the satellite;
determine whether the UE is enabled to communicate with the satellite;
determine whether the UE is approaching a region in which the satellite is providing wireless telecommunication coverage;
determine whether the indication of the access class stored at the UE is included in the one or more access classes authorized to communicate with the satellite;
when determining that the UE is enabled to communicate with the satellite, that the UE is approaching the region in which the satellite is providing wireless telecommunication coverage, and that the indication of the access class stored at the UE is not included in the one or more access classes authorized to communicate with the satellite, reduce communication with the satellite by refraining from sending a request to connect to the satellite and send a request to the wireless telecommunication network authorize the UE to communicate with the satellite; and
when determining that the indication of the access class stored at the UE is included in the one or more access classes authorized to communicate with the satellite, send the request to connect to the satellite.

9. The system of claim 8, comprising instructions to:
establish communication between the UE and the satellite;
receive a modification to the one or more access classes authorized to communicate with the satellite,
wherein the modification removes the access class associated with the UE from the one or more access classes authorized to communicate with the satellite; and
discontinue communication between the UE and the satellite.

10. The system of claim 8, comprising instructions to:
obtain the access class indicating that the UE is authorized to communicate with the satellite; and
storing the access class on the UE.

11. The system of claim 8, wherein the instructions to obtain the indication of the access class associated with the UE comprise instructions to:
obtain from a Home Subscriber Server the access class associated with the UE.

12. The system of claim 8, comprising instructions to:
determine whether the UE is configured to communicate with the satellite; and
upon determining that the UE is configured to communicate with the satellite, send a request to subscribe the UE to communicate with the satellite.

13. The system of claim 8, wherein the one or more access classes authorized to communicate with the satellite and the access class associated with the UE include satellite communication for Public Land Mobile Network staff, satellite communication for emergency services, satellite communication for public utilities, satellite communication for security services, satellite communication for Public Land Mobile Network use, or satellite communication for general public.

14. The system of claim 8, wherein the instructions to store the indication of the access class at the UE comprise instructions to:
store the indication of the access class in a SIM card or eSIM card associated with the UE.

15. The system of claim 8, wherein the one or more access classes authorized to communicate with the satellite and the access class associated with the UE are defined in 3GPP TS 22.01.

16. A system comprising:
at least one hardware processor; and
at least one non-transitory memory storing instructions, which, when executed by the at least one hardware processor, cause the system to:
broadcast information associated with a satellite,
wherein the information indicates one or more access classes authorized to communicate with the satellite, and
wherein the one or more access classes authorized to communicate with the satellite are defined in 3GPP TS 22.01;
receive a request to establish communication with the satellite from a UE associated with an access class contained in the one or more access classes authorized to communicate with the satellite;
determine whether the UE is configured to communicate with the satellite;
determine whether the UE is approaching a region in which the satellite is providing wireless telecommunication coverage;
determine whether the access class associated with the UE authorizes communication with the satellite; and
when determining that the UE is configured to communicate with the satellite, that the UE is approaching the region in which the satellite is providing wireless telecommunication coverage, and that the access class associated with the UE does not authorize communication with the satellite, send a notification to the UE indicating a process to authorize the UE to communicate with the satellite;
establish communication between the UE and the satellite;
receive a modification to the one or more access classes authorized to communicate with the satellite to obtain a modified one or more classes authorized to communicate with the satellite,
wherein the modification removes the access class associated with the UE from the one or more access classes authorized to communicate with the satellite;
discontinue communication between the UE and the satellite; and broadcast the modified one or more classes authorized to communicate with the satellite.

17. The system of claim 16, comprising instructions to:
receive a request from the UE to complete the process to authorize the UE to communicate with the satellite; and
store an identifier associated with the UE and an indication that the UE is authorized to communicate with a satellite in a Home Subscriber Server.

18. The system of claim 16, wherein the one or more access classes authorized to communicate with the satellite and the access class associated with the UE include satellite communication for Public Land Mobile Network staff, satellite communication for emergency services, satellite communication for public utilities, satellite communication for security services, satellite communication for Public Land Mobile Network use, or satellite communication for general public.

19. The system of claim 16, wherein the instructions to store the indication of the access class at the UE comprise instructions to:
store an indication of the access class in a SIM card or eSIM card associated with the UE.

* * * * *